United States Patent [19]

Riegler et al.

[11] 4,169,569

[45] Oct. 2, 1979

[54] BASE ANCHORAGE FOR HEAVY MACHINERY

[75] Inventors: Ernst Riegler, Enns; Manfred Schmidt, Linz, both of Austria

[73] Assignee: Vereinigte Österreichische Eisen- und Stahlwerke-Alpine Montan Aktiengesellschaft, Linz, Austria

[21] Appl. No.: 888,575

[22] Filed: Mar. 20, 1978

[30] Foreign Application Priority Data

Apr. 6, 1977 [AT] Austria .................................. 2404/77

[51] Int. Cl.² .................................................. B23B 17/00
[52] U.S. Cl. ............................................ 248/680; 52/295; 151/68
[58] Field of Search .................... 248/19, 23; 52/295; 151/41.71, 41.76, 55, 63, 68

[56] References Cited

U.S. PATENT DOCUMENTS

| 1,081,741 | 12/1913 | Hipsley | 151/68 |
| 1,423,241 | 7/1922 | Minshull | 151/68 UX |
| 2,625,815 | 1/1953 | Black | 52/295 X |
| 3,401,733 | 9/1968 | Circle | 151/41.76 |
| 3,800,636 | 4/1974 | Zagar | 248/19 X |
| 3,927,497 | 12/1975 | Yoshinaga | 52/295 X |

Primary Examiner—J. Franklin Foss
Attorney, Agent, or Firm—Brumbaugh, Graves, Donohue & Raymond

[57] ABSTRACT

In a base anchorage for heavy machinery, in particular converters, an anchoring plate is concreted into a base and is firmly connected with at least one bolt, whose end projecting out of the base is provided with a screw thread. The at least one bolt is produced of high-tensile strength material and, at its lower end, it is screwed through a threaded bore in the anchoring plate and contacts, with at least one flattened side, a corresponding face of a securing plate fixed relative to the anchoring plate, the bolt thus being secured against rotation.

4 Claims, 5 Drawing Figures

BASE ANCHORAGE FOR HEAVY MACHINERY

BACKGROUND OF THE INVENTION

The present invention relates to a base anchorage for heavy machinery, in particular converters, comprising an anchoring plate concreted into the base and rigidly connected with at least one bolt, whose end projecting out of the concrete is provided with a screw thread.

In base anchorages of this kind, the connection between the bolt and the anchoring plate is of the greatest importance, since loosening of the bolt would necessitate the demounting of the heavy machinery, the removal of part of the concrete base, the tightening of the bolt and concreting of the anchorage again.

It is known to weld the bolt together with the base plate. In order to ensure a welding connection reliably resistant to any loads, a weldable quality steel has to be used for the bolts, if special measures, such as preheating, etc., are not used. Steels whose carbon content is so low that the formation of cracks during welding is safely avoided are appropriate. Steel frequently used for producing the bolts is, for instance, steel of the quality St 37T according to Austrain standard M 3115, having a carbon content of about 0.16%. Such steels, however, have a low yield point of only 205 N/nm$^2$ (21 kp/mm$^2$), so that bolts with large diameters, or a great number of bolts, respectively, have to be provided in order that the forces of the heavy machinery acting on the bolts can be accommodated. However, bolts having large diameters negatively affect the embedding of the anchorage in the concrete base. A further disadvantage is that a space corresponding to the diameter of the bolt and the great number of bolts had to be provided at the foot of the heavy machinery. The known construction therefore consumes excessive space and is heavy.

SUMMARY OF THE INVENTION

The invention aims at avoiding these disadvantages and difficulties and has as its object to provide a base anchorage in which as few bolts as possible, having small diameters, need to be used, so that the base anchorage and the machinery foot can be designed so as to be more space-saving and lighter. At the same time, the connection of the bolts with the anchoring plate, i.e. in the concreted state, should be reliably undetachable and producible in a simple manner.

This object is achieved according to the invention in that the bolt is produced of high-tensile material, preferably with a yield point of more than 590 N/mm$^2$ (60 kp/mm$^2$), and that the bolt, as its lower end, is screwed through a threaded bore of the anchoring plate. In order to secure against rotation the bolt contacts, with at least one flattened side, a corresponding face of a securing plate that is fixed relative to the anchoring plate.

Suitably, the securing plate is welded together with the anchoring plate.

Advantageously, the bolts are braced by a nut relative to the anchoring plate.

BRIEF DESCRIPTION OF THE DRAWINGS

The invention shall now be described in more detail by way of two embodiments and with reference to the accompanying drawing, wherein.

DESCRIPTION OF EXEMPLARY EMBODIMENTS

Figure 1:
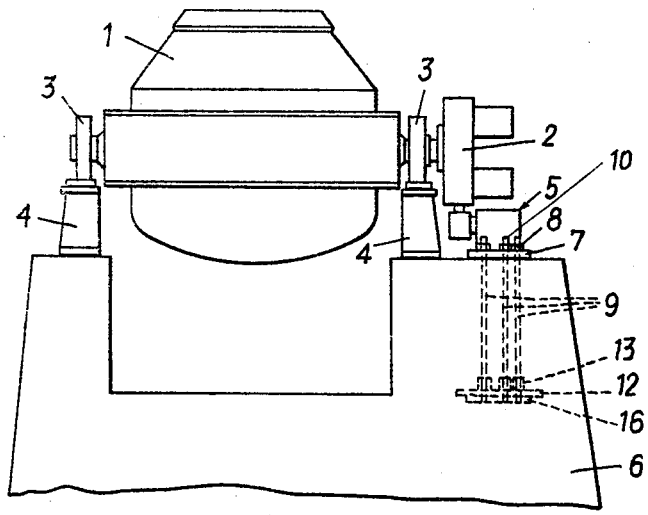
FIG. 1 illustrates the arrangement of a base anchorage according to the invention on a converter stand.
Figure 3:
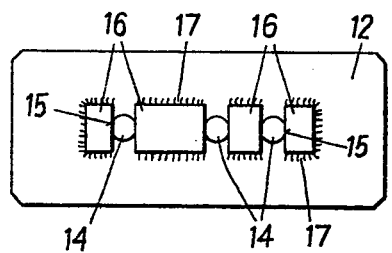
FIG. 3 is a view in the direction of the arrow III of FIG. 2, and FIGS. 4 and 5 illustrate a further embodiment, in a manner analogous to FIGS. 2 and 3.

A converter tiltable by means of a tilting drive 2 is arranged on base supports 4 via bearings 3. The tilting drive 2 is supported on the base 6 via a torque support 5. The foot 7 of the torque support 5 is fastened by nuts 8 to bolts 9 having threads 10 which project out of the base 6.

The lower ends of the bolts 9, which bolts may be several meters long, are also provided with threads 11, which are screwed into threaded bores in an anchoring plate 12. A counternut 13 causes each bolt 9 to be braced relative to the anchoring plate 12, so that loads caused by tensile forces are introduced immediately into the anchoring plate.

For securing the bolts 9 against rotation relative to the anchoring plate 12, as is necessary for instance when tightening or loosening the nuts 8, the ends 14 of the bolts 9 projecting out below the anchoring plate 12 are flattened. These flattened sides 15 are each contacted by a securing plate 16 firmly connected to the anchoring plate 12, e.g. by welding seams 17.

In the example of an anchorage of a converter torque support 5 to the base 6 as illustrated in FIG. 1, a total of six bolts 9 are provided. Each bolt 9 is destined to accommodate a tensile force of 2.58 MN 263 t). The tightening torque of a nut on the bolt is 16,922.25 Joule (725 kpm). As material for producing the bolts, steel of the strength class 12.9 according to DIN (German Industrial Standard) 267 (1967/68) was chosen. This steel has a carbon content of 0.42% and contains the alloy elements Cr and Mo. Therefore the steel can be welded only by applying special measures. As a result the application of complex welding methods and extensive control measures for securing the desired quality of steel would also be necessary, if it were desired in a known way to weld together bolts produced of this material and the anchoring plate. If, in order to avoid these difficulties, instead of using steel of the strength class 12.9 having a yield point of at least 1,059.12 N/mm$^2$ (108 kp/mm$^2$), steel of the quality of approximately St 37T according to Austrian standard M 3115 is used, the diameter of the bolts would have to be doubled approximately. In particular instead of bolts of the strength class 12.9 having a diameter of only 72 mm, bolts would have to be used with a diameter of about 144 mm. As a result the amount of material necessary for producing the bolts would be increased by four times. However, with the present invention welding of the bolts is avoided and bolts of the strength class 12.9 can be used without difficulty.

Figure 5:
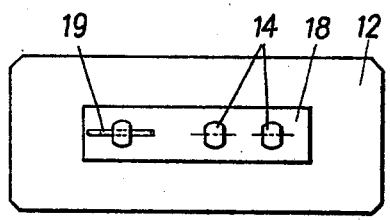
Figure 2:
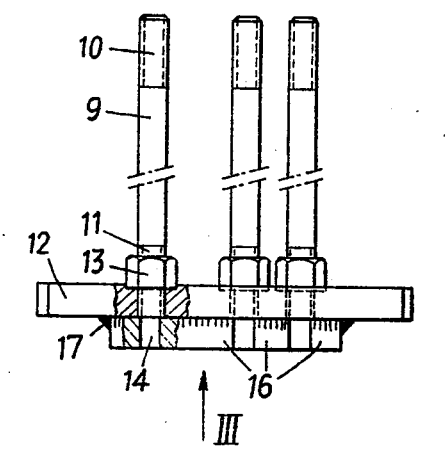
FIG. 2 is an embodiment of the base anchorage in the side view.
Figure 4:
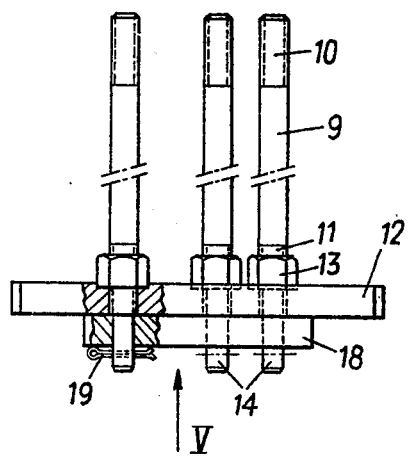

In the embodiment illustrated in FIGS. 4 and 5, the bolts 9 are secured against rotation by a securing plate 18 provided with openings corresponding with the flattened ends 14 of the bolts. The plate 18 is secured against falling of the bolt 9 by a split pin 19. This embodiment is particularly suitable, if the anchoring plate 12 is also produced of high-tensile strength steel. If only one bolt is used for each anchoring plate, the plate 18 is suitably secured against rotation by being fastened with a screw to the anchoring plate.

What we claim is:

1. In a base anchorage for heavy machinery, in particular converters, of the type including a base, an anchoring plate concreted into said base and at least one bolt firmly connected with said anchoring plate, said bolt having a lower end, and an upper end projecting out of said base and provided with a screw thread, the improvement comprising:

said anchoring plate having at least one bore provided with a thread;

said at least one bolt being provided with a screw thread at its lower end and being screwed, at said lower end, through said threaded bore of said anchoring plate, said at least one bolt having at least one flattened side at said lower end, and being produced of high-tensile strength material; and a securing plate fixed relative to said anchoring plate and having a face corresponding to said at least one flattened side of said at least one bolt, said at least one bolt contacting, with said at least one flattened side, said corresponding face of said securing plate, so as to be secured against rotation.

2. A base anchorage as set forth in claim 1, wherein said at least one bolt is produced of material having a yield point of more than 588.6 N/mm$^2$ (60 kp/mm$^2$).

3. A base anchorage as set forth in claim 1, wherein said securing plate is welded together with said anchoring plate.

4. A base anchorage as set forth in claim 1, wherein a nut is provided for bracing said at least one bolt relative to said anchoring plate.

* * * * *